United States Patent [19]
Kamin

[11] 4,112,463
[45] Sep. 5, 1978

[54] SYSTEM FOR DETECTING A MOTION IN THE MONITORING AREA OF TWO OR MORE TELEVISION CAMERAS

[75] Inventor: Gerhard Robert Kamin, Traisa, Fed. Rep. of Germany

[73] Assignee: Robert Bosch GmbH, Stuttgart, Fed. Rep. of Germany

[21] Appl. No.: 783,322

[22] Filed: Mar. 31, 1977

[30] Foreign Application Priority Data

Mar. 31, 1976 [DE] Fed. Rep. of Germany ....... 2613706

[51] Int. Cl.$^2$ .......................... H04N 5/22; H04N 7/18
[52] U.S. Cl. ..................................... 358/105; 358/108; 358/146; 358/181
[58] Field of Search ............... 358/105, 146, 139, 181, 358/108

[56] References Cited

U.S. PATENT DOCUMENTS

| | | | |
|---|---|---|---|
| 3,580,998 | 5/1971 | Hammond | 358/146 |
| 3,590,151 | 6/1971 | Keith | 358/105 |
| 3,686,434 | 8/1972 | Lemelson | 358/105 |
| 3,740,466 | 6/1973 | Marshall | 358/105 |
| 3,743,768 | 7/1973 | Copland | 358/105 |

Primary Examiner—Howard W. Britton
Attorney, Agent, or Firm—Littlepage, Quaintance, Murphy, Richardson and Webner

[57] ABSTRACT

A plural-camera television monitoring system in which scenes or objects to be monitored are scanned by a plurality of television cameras that are not synchronized with each other, in which time-division multiplexed image signals are derived from the video signals transmitted by the cameras for comparison with corresponding image signals that are stored at an earlier time to detect changes or motion in the scanned scenes, and in which a control signal is derived from time-division multiplexed synchronizing signals originating from the cameras and characterizes the end or beginning of either an odd or even field to initiate a sequence of operation involving the comparison of the time-division multiplexed image signals with their corresponding stored image signals.

6 Claims, 4 Drawing Figures

SYSTEM FOR DETECTING A MOTION IN THE MONITORING AREA OF TWO OR MORE TELEVISION CAMERAS

FIELD OF INVENTION

This invention relates to a television monitoring system in which a change or motion in a monitored scene is detected by storing an image signal of the scene in its desired or original form and then comparing it with an image signal of the scene in its actual, presently existing state.

BACKGROUND

An automatic television monitoring system of the foregoing type is described in the German printed application DT-OS No. 19 13 768, wherein a television camera is focused on an object or scene to be protected to produce an "actual" video signal. A comparison image store or image signal representing the monitored object or scene in its original or desired state is stored at an earlier time in a storage unit to produce a "desired" or original video signal. The video signals from the television camera and the comparison image store are compared in a difference signal detector. The difference signal which is generated will be equal to zero when no change in the scene scanned by the television camera has taken place. However, if a change has taken place the "actual" video signal will differ from the "desired" video signal, making the difference signal greater than zero. As soon as the signal difference at the output of the signal difference detector exceeds a pre-selected threshold value for a pre-selected period of time, an alarm signal is given.

When the object or scene protection is extended to larger objects, scenes or several objects distant from each other, the foregoing type of monitoring scene requires several television cameras, a corresponding number of comparison image stores and a corresponding number of difference signal detectors. The system thus becomes more expensive and increases in cost in proportion to the number of television cameras used. Because of the limited monitoring area of an individual television camera, there is often a need for using several television cameras. Substantial systems costs arise in this case, especially as the result of the large number of comparison image stores. To overcome this disadvantage, it is proposed in the German printed application DT-AS No. 24 11 634, on the one hand, to transmit the video signals of the individual television cameras by way of a time-controlled time-division multiplex (TDM) to the input of a single information store, and, on the other hand, also to transmit the video signals in time-division multiplexing fashion through a second TDM electronic switch to a first input of a comparison device. In this case, all television cameras are synchronized by a synchronizing scanner, which is contained in the information store, in such a manner that a frequency and phase synchronization of the television cameras is constantly assured, and, in addition, the second TDM electronic switches are so controlled through special characteristic signals, which are also stored in the information store, that, at the two inputs of the comparison device, an actual video signal of a certain television camera on the one hand, and a video signal of this television camera, which is temporarily stored in the information store and which is therefore time-delayed, on the other hand, are always simultaneously present.

However, the synchronization of several television cameras from one central control is relatively expensive. In addition, unintended false alarms can be triggered by synchronization errors in this monitoring system.

SUMMARY AND OBJECTS OF INVENTION

It is therefore the object of this invention to provide a novel system for detecting motion or change in the monitoring area of two or more television cameras which are not required to be synchronized with each other.

A more specific object of this invention is to provide a novel plural-camera television monitoring system wherein the video signals produced by the cameras are fed in time-division multiplexing fashion into an evaluation device which is not equipped with a camera-synchronizing impulse generator without triggering a false alarm even though a phase shift occurs in the synchronizing signal coming into the evaluation device upon switching from one camera to the next.

A further object of this invention is to provide a novel plural-camera television monitoring system which is less expensive than the one described in the German printed application DT-AS No. 24 11 634 mentioned above.

In accordance with this invention, the problem explained above is solved by deriving from the transmitted, time-division multiplexed synchronizing signals a control signal which characterizes the end or the beginning of a pre-selected one of the odd and even fields (also referred to as the odd and even numbered half images) making up a frame (i.e., the complete picture) and further by utilizing the thusly derived control signal to initiate an evaluation sequence in which the appropriate stored image signal is read out of memory and compared with the actual image as it presently exists in a signal difference detector. In this manner, above-mentioned control signal causes the stored image signal (which may be in digital form) to be read out effectively in phase with the actual incoming image signal so that the same picture detail points or elements of the actual or presently existing televised scene and the original, desired scene will be compared with each other to avoid false alarms.

Further objects and advantages of this invention will appear as the description proceeds in connection with the appended claims and the below-described drawings.

DETAILED DESCRIPTION

Figure 1:
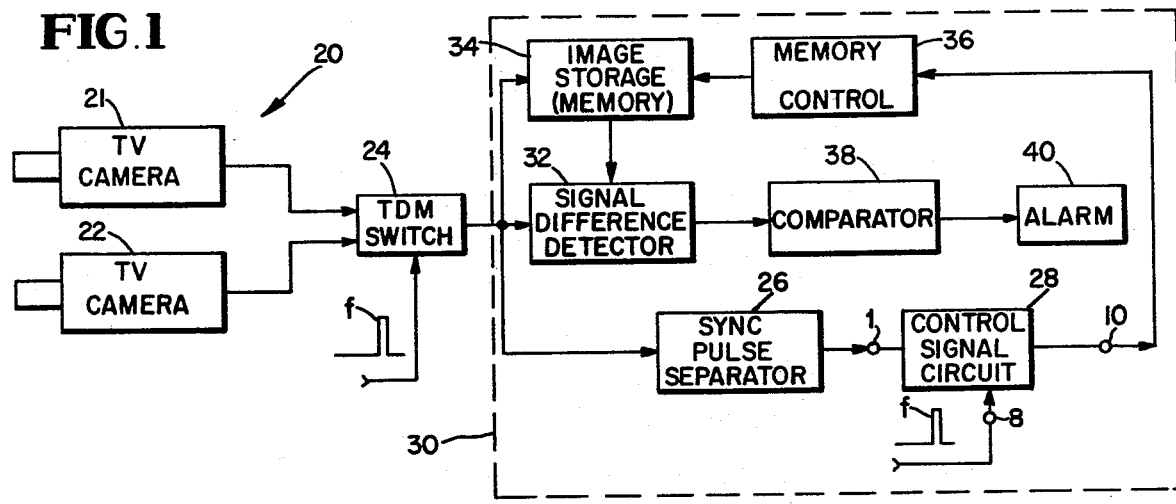
FIG. 1 is a schematic block diagram of a plural-camera television monitoring system incorporating the principles of this invention.

Referring to FIG. 1, the plural-camera television monitoring system incorporating the circuit of this invention is generally indicated at 20 and is shown to comprise at least two television cameras 21 and 22 for scanning separate scenes or objects or separate parts of a scene or object. It will be appreciated that although only two TV cameras are shown in FIG. 1 for the purpose of illustration, the television monitoring system incorporating the principles of this invention usually includes three or more TV cameras. The TV cameras employed in system 20 are not mutually synchronized or correlated. Therefore, a phase difference may exist between the synchronizing signals transmitted by cameras 21 and 22.

As shown in FIG. 1, the video signals from cameras 21 and 22 are fed to separate inputs of a time-division multiplexing switch 24. Switch 24 may be of the stepper type or of any other suitable construction for time-division multiplexing the incoming video signals. The TDM video signal output signal of switch 24 is fed to the input of a synchronizing or sync pulse separator or clipper 26.

It will be appreciated that samples of the video signals from cameras 21 and 22 are successively and recurrently supplied at the output of switch 24 in accordance with the switch's sampling or stepping rate. The sampling rate is determined by constant frequency pulses (indicated at $f$) from a suitable pulse source.

The sync pulse separator 26 may be of any suitable conventional construction for separating the synchronizing signal (i.e., the sync pulses) from the incoming video signal.

The control pulse circuit of this invention is indicated at 28 in FIG. 1 and comprises a signal input terminal 1 and a signal output terminal 10. The separated sync pulses at the output of separator 26 are fed to the input terminal 1 of circuit 28 as shown.

The control signal circuit 28 forms a part of an evaluation device 30 in which a signal difference detector 32 compares the "actual" or presently existing image or picture signal values with the "desired" or original image or picture signal values. These values are derived from the video signals that are produced by cameras 21 and 22.

Figure 2:
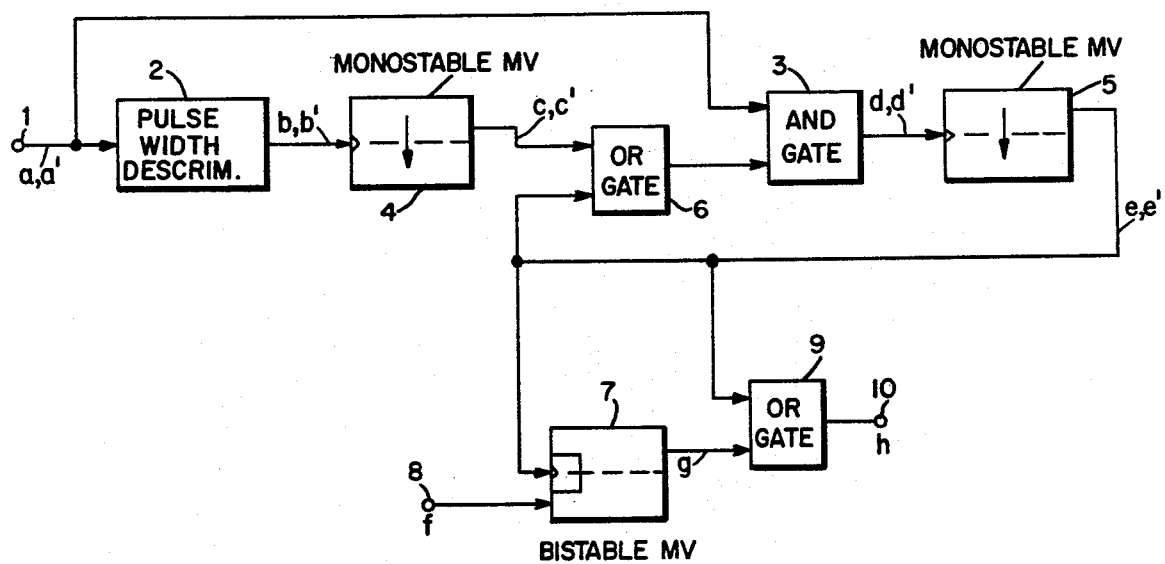
FIG. 2 is a schematic block diagram of one embodiment of control signal-producing circuit of this invention.

As shown in FIG. 2, circuit 28 comprises a pulse width discriminator 2, a pair of monostable multivibrators 4 and 5, a bistable multivibrator 7, an AND gate 3 and a pair of OR gates 6 and 9.

The sync signal fed to terminal 1 is applied to the input of pulse width discriminator 2 and to the input of AND gate 3. The pulse width discriminator 2 is designed in such a manner to produce a horizontal frequency impulse at the end of each horizontal sync pulse (4.7 $\mu$s in the CCIR standard) in the incoming sync signal. In other words, discriminator 2 discriminates against any incoming pulse that is wider or narrower than the 4.7 microsecond horizontal sync pulse width. The voltage-time diagrams of FIG. 3 clarify the functional mode.

Figure 3:
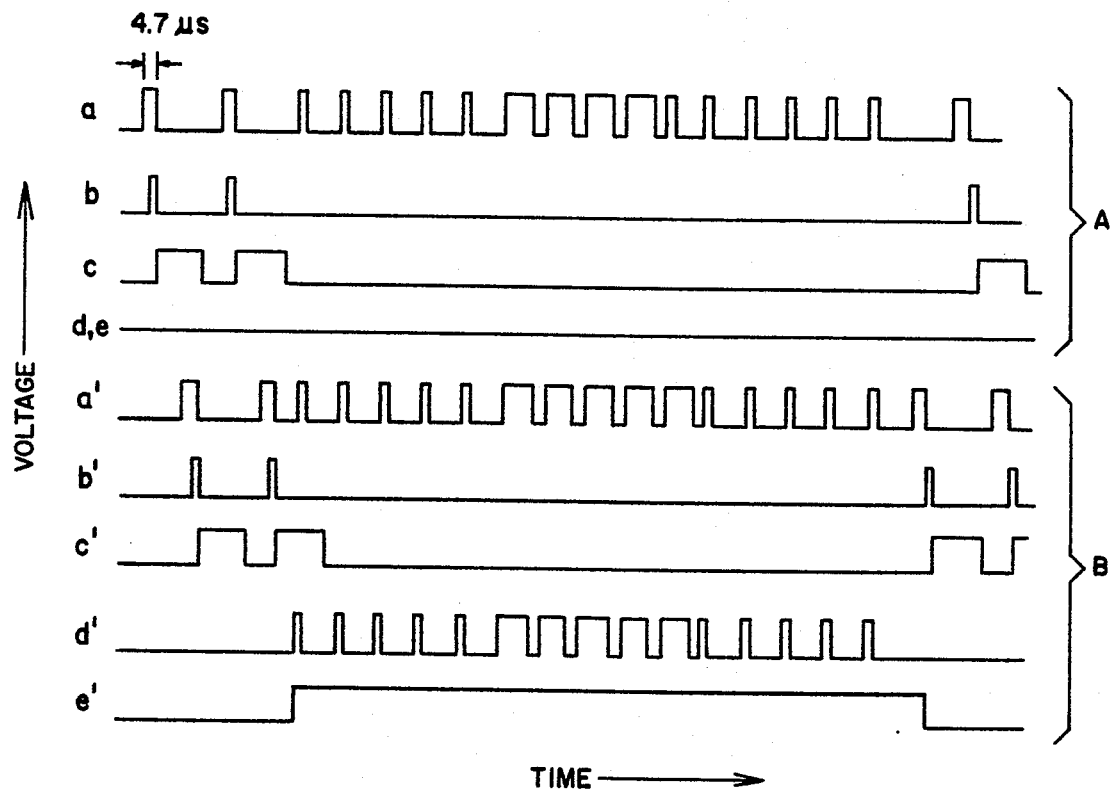
FIGS. 3 and 4 are voltage-time diagrams showing various pulse waveforms occurring in the operation of the circuit of this invention.

For this purpose, it is first assumed that a synchronizing signal is present at terminal 1. In FIG. 3, the sync signal waveform $a$ includes a complete vertical portion of the incoming synchronizing signal at the end of the even fields (also called the even-numbered half images). The corresponding horizontal frequency impulses at the output of discriminatr 2 are indicated at $b$ in FIG. 3.

Still referring to FIG. 3, the sync signal waveform $a'$ includes the complete vertical portion of the incoming sync signal at the end of the odd fields (also called the odd-numbered half images). The corresponding output of discriminator 2 for this pulse input $a'$ is indicated at $b'$ in FIG. 3.

The output of discriminator 2 is fed to the input of the monostable multivibrator 4. Multivibrator 4 expands the widths of the pulses produced by discriminator 2 to somewhat more than half a horizontal sync pulse period.

The output of multivibrator 4 is connected one input of OR gate 6, and the output of multivibrator 5 is connected to the other input of OR gate 6 for a purpose to be explained shortly. The output of OR gate 6 is connected to one input of AND gate 3, and terminal 1 is connected to the other input of AND gate 3 as shown. The output of AND gate 3 feeds the input of monostable multivibrator 5.

The pulse waveform $c$ in FIG. 3 is the output of multivibrator 4 at the end of the even fields (i.e., during the interval in which the sync signal waveform $a$ is applied to terminal 1). Pulse waveform $c'$ is the output of multivibrator 4 at the end of the odd fields (i.e., during the interval in which the sync signal waveform $a'$ is applied to terminal 1).

AND gate 3 logically combines the sync signal ($a$, $a'$) present at the terminal 1 with the pulse waveform output ($b$, $b'$) of multivibrator 4.

For the interval in which the sync signal $a$ is applied to terminal 1 at the end of the even fields, the output of AND gate 3 will be low at zero volts as indicated by the zero volt waveform $d$ in FIG. 3. Therefore, no pulses will be produced at the output of AND gate 3 during the interval in which the vertical sync signal portion $a$ is applied to terminal 1.

The pulse waveform $d'$ in FIG. 3 is the output of AND gate 3 at the end of the odd fields during the interval in which the sync signal $a'$ is applied to terminal 1.

It will be noted that each of the sync signal waveforms $a$ and $a'$ includes the complete vertical synchronizing signal which comprises the vertical sync pulses themselves and the pre- and post-equalizing pulses. In each of the pulse waveforms $a$ and $a'$ a number of horizontal pulses are shown both before and after the complete vertical synchronizing signal.

The pulse waveform $d'$ in FIG. 3 is the output of AND gate 3 during the interval in which waveform $a'$ is applied to terminal 1.

From the foregoing description it is clear that the circuitry thus far described has the effect of separating the complete vertical sync signal portion at the end of the odd fields from the remainder of the sync signal, namely the horizontal sync pulses and the vertical signal portion at the end of the even field. As a result, the output of AND gate 3 will be a reproduction of the complete vertical sync signal (namely, vertical sync pulses and equalizing pulses) occurring only at the end of the odd fields. The output of AND gate 3 will be at the zero volt level throughout the intervals between the complete vertical sync signals occurring at the end of the odd fields as indicated by the zero volt waveform $d$.

The pulses in waveform $d'$ are applied to set multivibrator 5 which is of the retriggerable type. Multivibrator 5 expands the widths of the pulses in waveform $d'$ to somewhat more than one half of the horizontal sync pulse period.

The connection between multivibrator 5 and OR gate 6 provides for the feedback of the output of multivibrator 5 to the input side of AND gate 3. This feedback connection taken together with the pulse width expansion action of multivibrator 5 establishes a holding or locking circuit or condition to keep the output of multivibrator 5 in its high state as long as additional pulses follow in the sync signal at a spacing of at most one half horizontal duration. This holding or locking condition is maintained up to the last post-equalizing pulse in the sync pulse signal $a'$. As a result, the output of multivibrator 5 during the interval of the complete vertical signal in waveform $a'$ will be one continuous pulse as indicated at $e'$ in FIG. 3.

As shown, pulse $e'$ begins with the first equalizing pulse in waveform $a'$ and ends about half a line period after the last equalizing pulse belonging to the same blanking interval in waveform $a'$.

The output of multivibrator 5 during the interval of waveform $a$ will be at the zero volt level as indicated at $e$ because the output of AND gate 3 is low during this time. Accordingly, a pulse (namely pulse $e'$) will be produced at the output of multivibrator 5 only for and during the interval of the complete vertical signal occurring at the end of the odd fields. At all other times, the output of multivibrator 5 will be at zero volts including the time interval of the vertical sync signals occurring at the end of the even fields. Thus, only one pulse (namely pulse $e'$) will be produced at the output of multivibrator 5 for each frame, and this pulse will start at the end of the odd field and terminate at the beginning of the following even field.

From the description of the waveforms shown in FIG. 3 it will be understood that the set of waveforms in the bracket A (namely $a, b, c, d$ and $e$) and the set of waveforms in the bracket B (namely $a', b', c', d'$ and $e'$) occur in tandem and not simultaneously.

Because the control pattern or sequence of the evaluation device 30 in system 20 is determined by the half vertical frequency impulse of the particular camera which is connected, by counting, and because the cameras, between which switching takes place by the time-multiplex process, are not synchronized with each other, transition problems in the evaluation device can occur due to the unavoidable phase shifts in the synchronized signal upon switching from one camera to another. Thus, for example, the switching point in time in the new synchronizing signal can be located at any point. The impulse of the half vertical frequency, initiated by the previous synchronizing signal, is shortened and defective control signals develop in the evaluation device, influencing the counter, which determines the program pattern or sequence in a manner which cannot be predicted. For eliminating this disadvantage, an additional circuit is provided at the output of the monostable multivibrator 5. This additional circuit comprises the bistable multivibrator 7. As shown, the output of multivibrator 5 is connected to the timed input of the bistable multivibrator 7. The pulse signal $f$ which determines the TDM switching point in time is applied by way of terminal 8 to a time-independent setting input of the bistable multivibrator 7.

As shown in FIG. 2, an output of the bistable multivibrator 7 is connected to one input of OR gate 9, and the output of multivibrator 5 is connected to the other input of OR gate 9. The output of OR gate 9 is connected to terminal 10.

Figure 4:
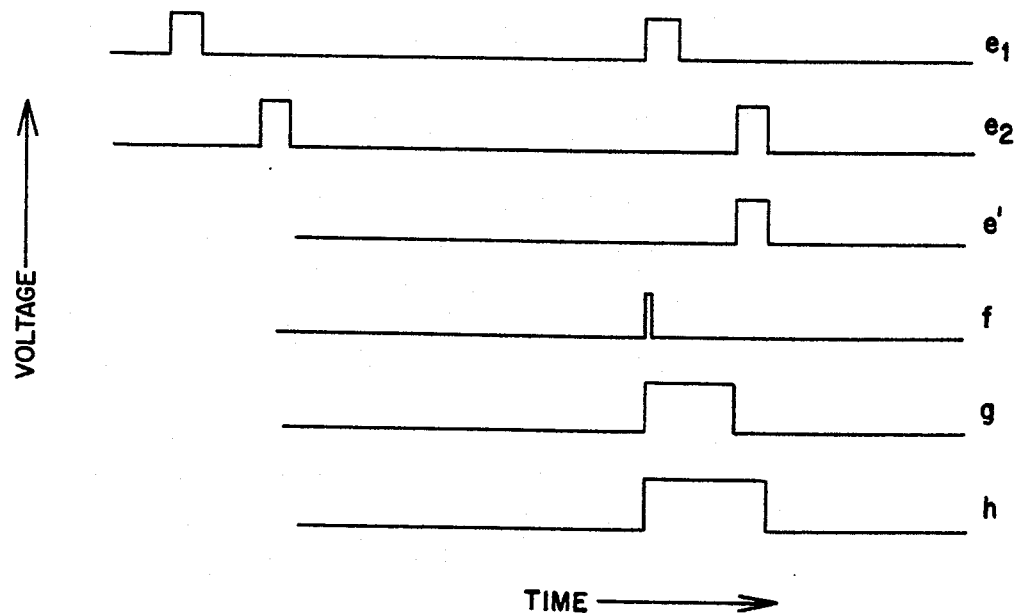

The interaction resulting from switching from one camera to another is illustrated in FIG. 4. In FIG. 4, the pulses in waveform $e_1$ represent the vertical signal portions at the end of the odd fields for camera 21, and the pulses in waveform $e_2$ represent the vertical signal portions at the end of the odd fields for camera 22. The pulse frequency in waveform $e_1$ therefore represents the frame rate for camera 21, while the pulse frequency in waveform $e_2$ represents the frame rate for camera 22.

Because the two television cameras 21 and 22 are not synchronized with each other, there may be a phase or time displacement between waveforms $e_1$ and $e_2$ as illustrated in FIG. 4.

The point in time at which the TDM switching pulse $f$ occurs for switching from camera 21 to camera 22 is also shown in FIG. 4. Pulse waveform $g$ is the output of bistable multivibrator 7, and pulse waveform $h$ is the output of OR gate 9.

As shown in FIG. 1, the bistable multivibrator pulse output $g$ is switched to its high state on the leading edge of switching pulse $f$ so that the leading edge of pulse $g$ coincides in time with the switching point. On the leading edge of pulse $e'$, the output of the bistable multivibrator 7 is switched to its low state, thus establishing the trailing edge of pulse $g$. As shown, pulse $e'$, which terminates pulse $g$, occurs after the pulse $f$ which causes the switching from camera 21 to camera 22.

Because of the pulse inputs $g$ and $e'$ to OR gate 9, a pulse $h$ (see FIG. 4) will be produced at output terminal 10. The leading edge of pulse $h$ coincides with the leading edge of pulse $g$, and the trailing edge of pulse $h$ coincides with the trailing edge of pulse $e'$. The trailing edge of pulse $h$ initiates the beginning of the evaluation sequence in the evaluation device or unit 30. This evaluation sequence involves the steps of first reading out the stored, "desired" image signal from a suitable memory or storage unit 34 and then comparing the "desired," readout image signal with the "actual" image signal of the scene as it presently exists by means of the signal difference detector 32.

From the foregoing description it will be appreciated that the evaluation sequence mentioned above is initiated by the trailing edge of pulse $h$ at the beginning of a frame independently of time-multiplexed switching from one camera to another. It also will be appreciated that the pulse signal $e'$ indicates or represents the end of an oodd field and the beginning of the next even field.

In the illustrated embodiment the memory 34 and the output of switch 24 are connected to inputs of the signal difference detector 32 so that the "desired" image signal read out of the memory and the video signal representing the "actual" image are fed to detector 32 from comparison. It is evident that if the "desired" image signal is stored in the memory in digital form, the picture detail portion of the video signal taken from the output of switch 34 will require a corresponding conversion to digital form to effectuate the comparison of "actual" and "desired" image signals in detector 32. The conversion of the TDM video signal to digital form may be accomplished in detector 32 or separately from detector 32.

To accomplish the read out of the stored, "desired" image signal, any suitable memory control, as indicated at 36 in FIG. 1, may be employed for addressing the memory 34. The readout control 36 may be computer programmed and responsive to the trailing edge of pulse signal $h$ to read out the appropriate image signal at the proper time for the camera that is connected by switch 24 to detector 32.

The difference output signal of detector 32 is representative of any difference between the compared "actual" and "desired" image signals and may be fed to a comparator 38 for comparison with a pre-selected threshold value. If the difference signal produced by detector 32 exceeds the threshold for a pre-selected time, comparator 38 will supply a signal for triggering an alarm 40.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A control circuit adapted to be connected in a plural-camera television monitoring system and comprising an input terminal for receiving time-division multiplexed synchronizing signals that are separated from the video signals of a plurality of television monitoring cameras in said system, first means connected to said input terminal for separating from the time-division multiplexed synchronizing signals only the alternatively occurring ones of the vertical signal portions that occur at the beginning of a preselected one of the odd and even video signal picture fields, and second means connected to said first means for deriving a pulse from each separated vertical signal portion to mark the beginning of said pre-selected one of said fields.

2. A control circuit adapted to be connected in a plural-camera television monitoring system in which a plurality of cameras are positioned to scan the scenes to be monitored to supply a plurality of video signals corresponding in number to the number of said cameras, in which sequentially occurring time-division multiplexed image signals representing said scenes in their presently existing states are derived from said video signals and are compared with corresponding stored image signals to detect changes in said scenes, and in which the synchronizing signals transmitted by said cameras are time-division multiplexed and are separated from the remainder of said video signals, said control circuit comprising first means for separating only alternately occurring vertical signal portions from the time-division multiplexed synchronizing signals, and second means connected to said first means for deriving from each of the separated vertical signal portions a pulse to initiate a sequence of operation in which one of the time-division multiplexed image signals is compared with an associated one of said stored signals at the beginning of a preselected one of the odd and even fields in the pictures represented by the video signals.

3. In a plural-camera television monitoring system having a plurality of television cameras for scanning separate scenes to be monitored to provide for the transmission of a plurality of video signals corresponding in number to the number of said cameras, switching means for time-division multiplexing said video signals, means for storing image signals derived from said time-division multiplexed signals and representing the scanned scenes in their desired states, and means for comparing the stored signals with further image signals derived from the time-division multiplexed signals occurring subsequent to the storage of said stored signals for detecting any changes in said scenes, the improvement comprising means for separating the synchronizing signals from the time-division multiplexed video signals, means connected to said synchronizing signal separating means for deriving a control signal indicating the beginning of a pre-selected one of the odd and even fields in the pictures represented by the video signals, and means responsive to said control signal for effecting the comparison of said further signals with corresponding ones of said stored signals.

4. A system for detecting a change in the monitored field of view of any of several unsynchronized television cameras, each of which independently originates a video signal including associated synchronizing pulse signals, the system comprising: a plurality of television cameras, a time-division multiplex video signal switching means the input of which is connected to the cameras for periodically and sequentially selecting time-division multiplexed video image signals corresponding to the video signals from each of said television cameras, and evaluation means connected to the output of the time-division multiplex switching means for detecting and responding to changes in said video image signals, the evaluation means comprising an image storage means connected to the output of the time-division multiplex switching means for storing said video image signals;

synchronizing pulse separator means also connected to the output of the time-division multiplex switching means for separating the synchronizing pulse signals from each periodically selected video image signal;

control circuity means connected to the output of said synchronizing pulse separator means for deriving a control signal from the separated synchronizing pulse signals, said control signal indiciating either the beginning or end of either the even-numbered or odd-numbered image field of said video image signals;

means, including a signal difference detector connected to the output of the time-division multiplex switching means, connected to the control circuit means and responsive to the control signal for sequentially comparing, for each television camera, the video image signal with a previously selected and stored video image signal, and which derives a difference signal indicative of the results of said comparison; and alarm means responsive to said difference signal which generates an alarm when said difference signal exceeds a predetermined threshold value.

5. The system defined in claim 4, wherein said control circuit comprises a pulse width discriminator connected to the output of said synchronizing pulse separator means for deriving an impulse signal or half vertical frequency in response to horizontal synchronizing pulses contained within the synchronizing pulse signals separated by said pulse separator means;

a first monostable multivibrator connected in series with said pulse width discriminator for expanding to at least one-half horizontal synchronizing pulse period the impulse signal generated by said pulse width discriminator;

an OR gate, the first input of which is connected in series to the output of said first monostable multivibrator;

an AND gate, the first input of which is connected to the output of the OR gate and the second input of which is connected to said synchronizing pulse separator means;

a second monostable multivibrator connected to the output of the AND gate and which has a time constant greater than one-half horizontal synchronizing pulse period, the output of which is connected to a second input of the OR gate thereby effectively creating a holding circuit;

a bistable multivibrator, a first input of which is connected to the output of the second monostable multivibrator, a second input of which is connected to a timed signal source providing an impulse signal correlated with the sampling rate of said time-division multiplex switching means; and a second OR GATE, a first input of which is also connected to the output of the second monostable multivibrator, and a second input of which is connected to the output of the bistable multivibrator, the output signal of the second OR gate constituting said control signal.

6. The system defined in claim 4 wherein said control means comprises: an input terminal for receiving time-division multiplexed synchronizing signals that are separated from the video signals of a plurality of television monitoring cameras in said system, first means connected to said input terminal for separating from the time-division multiplexed synchronizing signals only the alternatively occurring ones of the vertical signal portions that occur at the beginning of a pre-selected one of the odd and even video signal picture fields, and second means connected to said first means for deriving a pulse from each separated vertical signal portion to mark the beginning of said pre-selected one of said fields.

* * * * *